(12) United States Patent
Liang

(10) Patent No.: US 9,228,437 B1
(45) Date of Patent: Jan. 5, 2016

(54) TURBINE AIRFOIL WITH PRESSURE SIDE TRAILING EDGE COOLING SLOTS

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 644 days.

(21) Appl. No.: 13/427,250

(22) Filed: Mar. 22, 2012

(51) Int. Cl.
- *F01D 5/18* (2006.01)
- *F01D 5/08* (2006.01)
- *B23P 15/04* (2006.01)

(52) U.S. Cl.
CPC ........ *F01D 5/087* (2013.01); *B23P 15/04* (2013.01)

(58) Field of Classification Search
CPC .............. F01D 5/187; F05D 2230/10; F05D 2230/5024; B23P 15/04
USPC ............ 415/115, 116; 416/97 R, 97 A, 96 A, 416/96 R, 232; 29/889.7, 889.025
See application file for complete search history.

(56) References Cited

U.S. PATENT DOCUMENTS

| | | | | |
|---|---|---|---|---|
| 4,128,928 A | * | 12/1978 | Shotts et al. | 29/889.721 |
| 4,303,374 A | * | 12/1981 | Braddy | 416/97 R |
| 4,601,638 A | | 7/1986 | Hill et al. | |
| 5,102,299 A | | 4/1992 | Frederick | |
| 5,378,108 A | | 1/1995 | Zelesky | |
| 5,931,638 A | | 8/1999 | Krause et al. | |
| 6,004,100 A | | 12/1999 | Przirembel et al. | |
| 6,174,135 B1 | | 1/2001 | Lee | |
| 6,241,466 B1 | * | 6/2001 | Tung et al. | 415/115 |
| 6,551,062 B2 | | 4/2003 | Leeke et al. | |
| 6,551,063 B1 | * | 4/2003 | Lee et al. | 416/97 R |
| 6,609,891 B2 | | 8/2003 | Leeke et al. | |
| 6,616,406 B2 | | 9/2003 | Liang | |
| 6,709,237 B2 | * | 3/2004 | Tiemann | 416/97 R |
| 6,715,988 B2 | | 4/2004 | Leeke et al. | |
| 7,371,048 B2 | | 5/2008 | Downs et al. | |
| 7,452,186 B2 | | 11/2008 | Charbonneau et al. | |
| 7,850,428 B2 | | 12/2010 | Tibbott et al. | |
| 8,052,392 B1 | | 11/2011 | Liang | |
| 8,079,813 B2 | | 12/2011 | Liang | |
| 8,096,771 B2 | | 1/2012 | Liang | |

* cited by examiner

Primary Examiner — Igor Kershteyn
(74) Attorney, Agent, or Firm — John Ryznic

(57) ABSTRACT

An air cooled turbine blade with a trailing edge cooling circuit that is formed by casting the airfoil with a pressure side trailing edge lip being oversized, and then machining away material from the pressure side wall to leave a pressure side bleed slot with a smaller (t/s) ratio than can be formed by casting alone. In another embodiment, the airfoil is cast with a trailing edge exit hole, and then the material on the pressure side wall in the trailing edge region is machined away to leave a pressure side bleed slot instead of an exit hole.

7 Claims, 6 Drawing Sheets

TURBINE AIRFOIL WITH PRESSURE SIDE TRAILING EDGE COOLING SLOTS

CROSS-REFERENCE TO RELATED APPLICATIONS

None.

GOVERNMENT LICENSE RIGHTS

None.

BACKGROUND OF THE INVENTION

1. Field of the Invention

The present invention relates generally to a gas turbine engine, and more specifically to an air cooled turbine airfoil with pressure side trailing edge cooling slots with a small t/s/ ratio.

2. Description of the Related Art Including Information Disclosed Under 37 CFR 1.97 and 1.98

In a gas turbine engine, such as a large frame heavy-duty industrial gas turbine (IGT) engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature is limited to the material properties of the turbine, especially the first stage vanes and blades, and an amount of cooling capability for these first stage airfoils.

The first stage rotor blade and stator vanes are exposed to the highest gas stream temperatures, with the temperature gradually decreasing as the gas stream passes through the turbine stages. The first and second stage airfoils (blades and vanes) must be cooled by passing cooling air through internal cooling passages and discharging the cooling air through film cooling holes to provide a blanket layer of cooling air to protect the hot metal surface from the hot gas stream.

The trailing edge region of turbine airfoils (rotor blades and stator vanes both have airfoils) is difficult to cool because they are very thin. This is especially important for high temperature turbine airfoils. Aerodynamic efficiency can be increased using a very thin trailing edge. However, thin trailing edges are difficult to cool and are very weak.

FIG. 1 shows a prior art turbine airfoil with a trailing edge region formed by a trailing edge region cooling channel 11 with an arrangement of pin fins 12 extending across the walls of the channel. Exit holes 13 open onto the trailing edge to discharge the cooling air. Because of the pin fins 12, the FIG. 1 trailing edge region must be relatively thick compared to other trailing edge cooling designs. In some turbine stages, an airfoil with this larger trailing edge thickness may induce high blockage and therefore a reduced turbine stage performance.

FIG. 2 shows another prior art first stage turbine blade with a trailing edge region cooling circuit that includes pin fins 12 extending across the cooling channel 11 but with a row of slots that open on the pressure side wall instead of the exit holes 13 of FIG. 1. The FIG. 2 design is referred to as a pressure side bleed for trailing edge cooling. The FIG. 2 design will allow for a thinner trailing edge than the FIG. 1 design. However, the FIG. 2 design still results in shear mixing between the cooling air discharged through the slots and the mainstream hot gas flow as the cooling air exits from the pressure side. The shear mixing of the cooling air with the mainstream gas flow reduces the cooling effectiveness of the trailing edge overhang and therefore induces an over-temperature at the airfoil trailing edge suction side location 16. This over-temperature location 16 will often be the life limiting location for the entire airfoil.

FIG. 3 shows a graph of dimensionless air flow parameter (P) directly proportional to a cut-back distance and inversely proportional to the cooling air flow rate as a function of P/S lip thickness (t) to cooling slot height (s) ratio. A small t/s ratio will yield a high air flow parameter (P). A smaller t/s ratio allows for a greater cut-back distance but with less cooling air flow for an equivalent film cooling effectiveness (e). Film cooling effectiveness (e) is the difference between the main gas stream temperature and the coolant film temperature divided by the difference between the main gas stream temperature and the coolant temperature at the exit slot. See U.S. Pat. No. 4,601,638 issued to Hill et al on Jul. 22, 1986 for a full description of the graph in FIG. 3.

In order to reduce the shear mixing between the cooling exit flow and the main stream hot gas flow, a reduction of the pressure side lip thickness and cut-back distance for the pressure side bleed airfoil trailing edge region cooling design are the key parameters.

U.S. Pat. No. 4,601,638 issued to Hill et al shows a pressure side bleed slot formed with a constant cross sectional entrance length followed by an expansion in the chordwise direction and a constant channel in the spanwise direction. As the cooling slot breakout onto the pressure side surface, the spanwise constant channel is then expanded in the radial direction. The spanwise and chordwise diffusion increases the cooling slot height and thus reduces the t/s ratio.

U.S. Pat. No. 5,378,108 issued to Zelesky shows another design for a pressure side bleed slot with a reduced cut-back distance by cutting the cooling slot through the airfoil trailing edge exit diameter tangent to the trailing edge diameter.

U.S. Pat. No. 6,616,406 issued to Liang shows a shorter cut-back distance in which the discharged cooling air is at a high angle to the airfoil surface for a thick pressure side lip design. This design suffers from a poor aerodynamic mixing because of the injection of the cooling air at the high angle relative at the trailing edge high Mach number region.

BRIEF SUMMARY OF THE INVENTION

An air cooled turbine airfoil with a trailing edge region having a pressure side bleed slot with a small (t/s) ratio that cannot be formed by casting alone. The airfoil is cast with the trailing edge region having an oversized pressure side trailing edge lip, and then the oversized lip is machined away to leave a pressure side bleed slot with a very small (t/s) ratio and a short cut-back length.

In another embodiment, the airfoil is cast with a trailing edge region having an exit hole opening onto the trailing edge, and then the pressure side wall in the trailing edge region is machined to form a pressure side bleed slot that has a short (t/s) ratio with a short cut-back length.

DETAILED DESCRIPTION OF THE INVENTION

Figure 1:
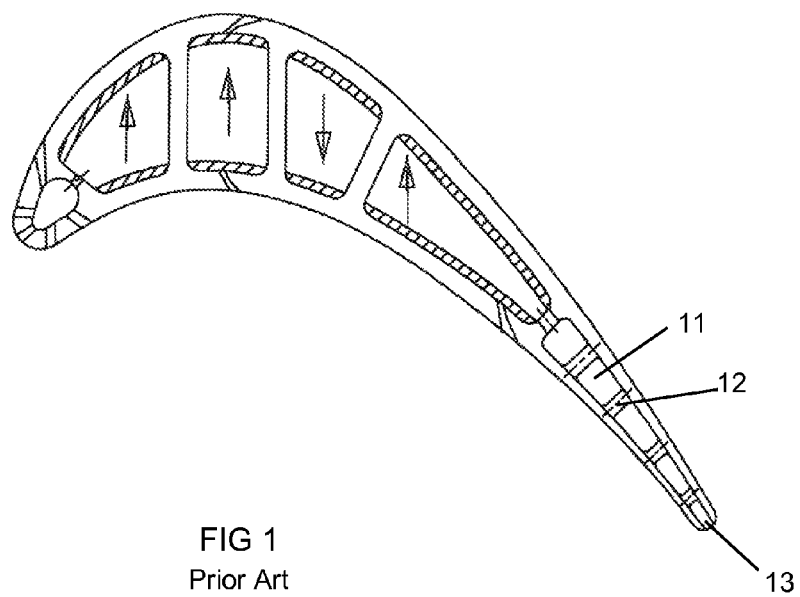
FIG. 1 shows a prior art turbine airfoil with a trailing edge cooling design having pin fins across a cooling channel and exit holes.
Figure 2:
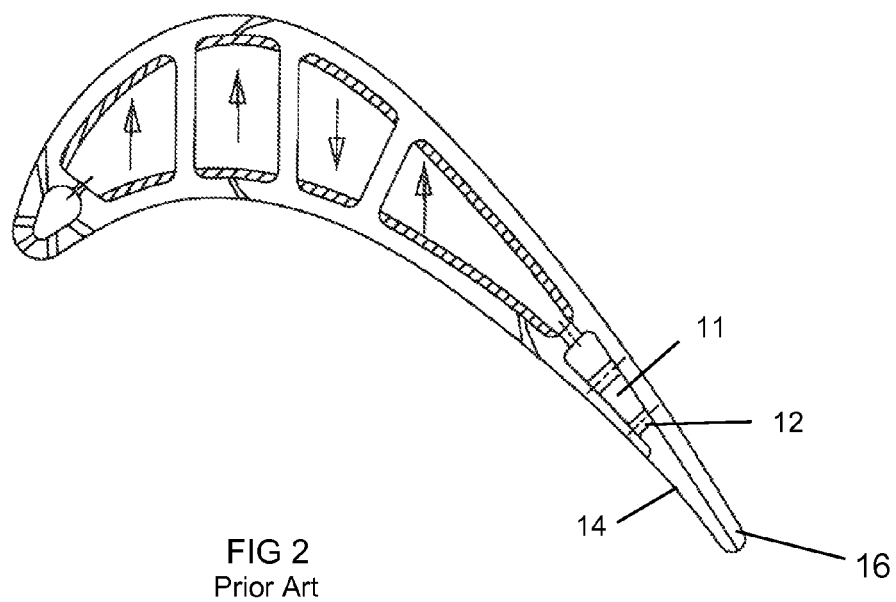
FIG. 2 shows another prior art turbine airfoil with trailing edge cooling using pressure side bleed slots.
Figure 3:
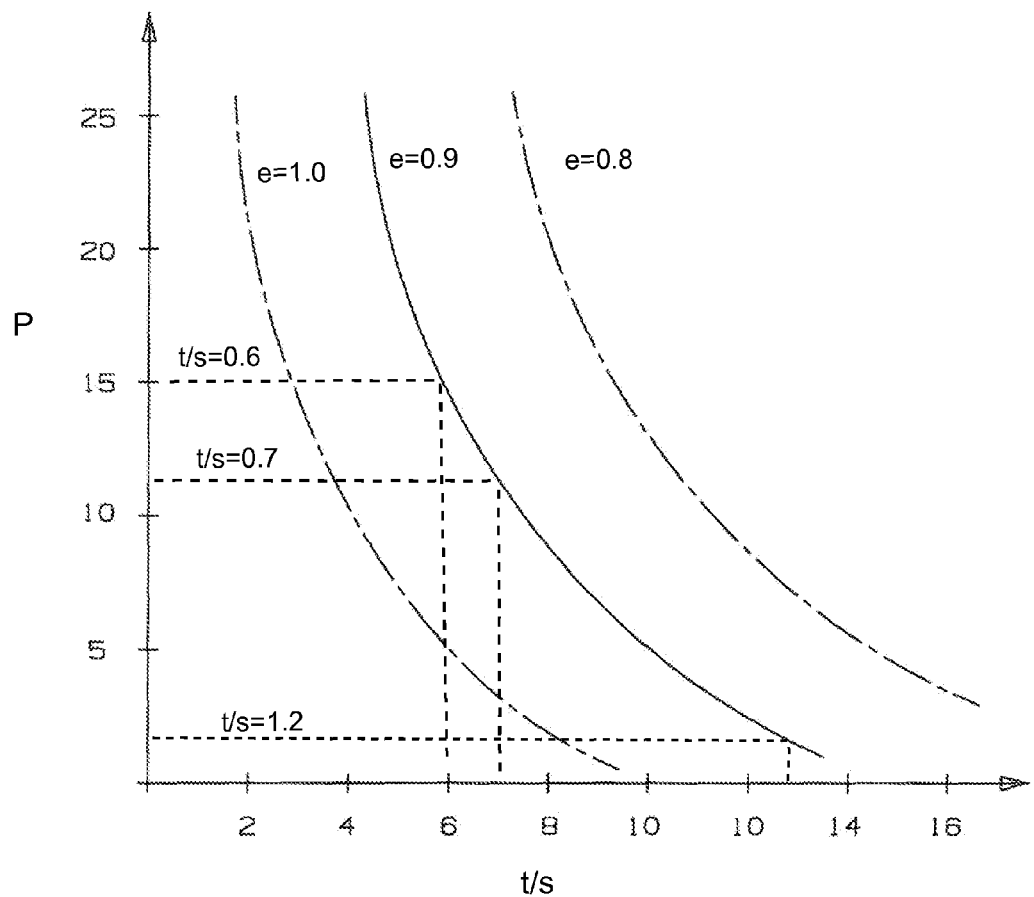
FIG. 3 shows a graph of the relation between air flow parameter (P) and a t/s ratio for different designs.
Figure 4:
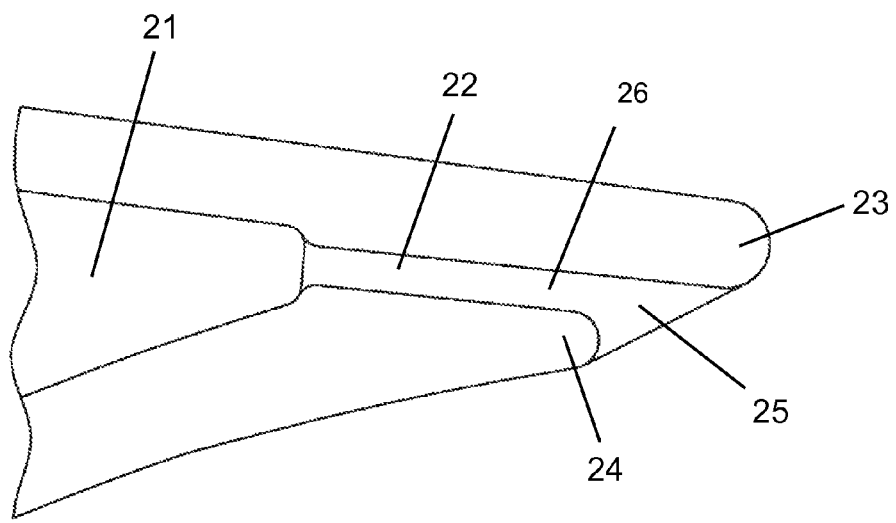
FIG. 4 shows a cross section view of a trailing edge region of an airfoil of the present invention with a thick oversized lip.

The present invention is a trailing edge cooling design for an airfoil which can be a rotor blade or a stator vane, where the trailing edge cooling design allows for an airfoil trailing edge pressure side lip to be very thin in order to produce a low (t/s) ratio. FIG. 4 shows the trailing edge region of an airfoil after initial casting where the airfoil includes a cooling air supply channel 21, a constant diameter metering section 22, a suction side wall with a trailing edge diameter 23, a pressure side wall with a trailing edge pressure side lip 24 with a constant diameter, and a pressure side bleed slot 25. The pressure side lip 24 is cast oversized because a smaller size lip would not be producible. A diffusion section 26 is formed between the constant cross section metering section 22 and the slot 25.

Figure 5:
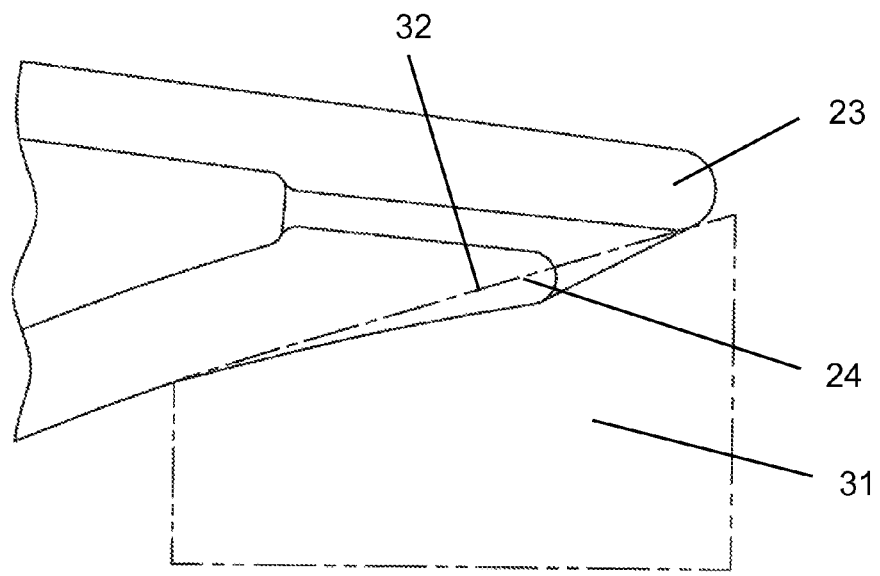
FIG. 5 shows a cross section view of the trailing edge region of the airfoil with the oversized lip and an outline of a cutting tool to remove material and shorten the lip according to the present invention.
Figure 6:
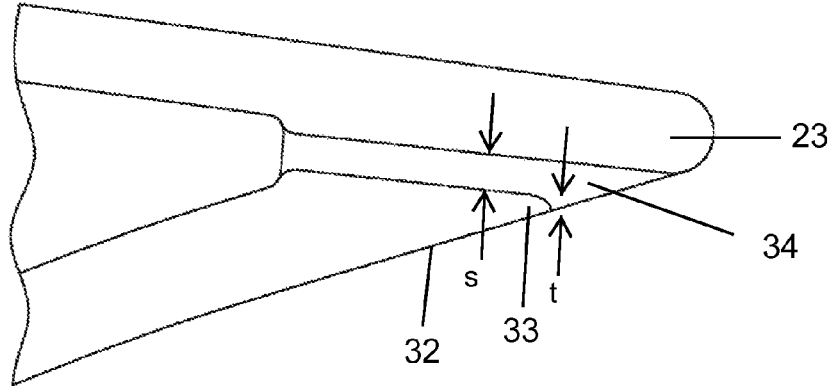
FIG. 6 shows the trailing edge region cooling design with the resulting thin pressure side lip after the machining away of the oversized lip.

FIG. 5 shows the airfoil trailing edge region with the oversized cast pressure side lip 24 with a cutting tool 31 that is used to remove material from the pressure side surface of the trailing edge region to form a thinner P/S lip as represented by the dashed line. FIG. 6 shows the airfoil trailing edge region cooling channel with the oversized P/S lip 24 removed to produce a small t/s ratio that cannot be formed by casting alone. This design allows for a shorter cut-back (distance from P/S lip to S/S lip) as well.

After casting the airfoil with the oversized P/S lip, a cutting process such as EDM (Electric Discharge Machining) can be used to remove the material and produce the straight line shown by the dashed line in FIG. 5. The exit slot surface is tangent to the airfoil trailing edge diameter. This design will reduce the t/s ratio with a short cut-back distance for the P/S bleed slot and improve the film cooling effectiveness level and minimize the shear mixing between the discharged cooling air and the hot gas flow for the pressure side bleed slot cooling.

Figure 7:
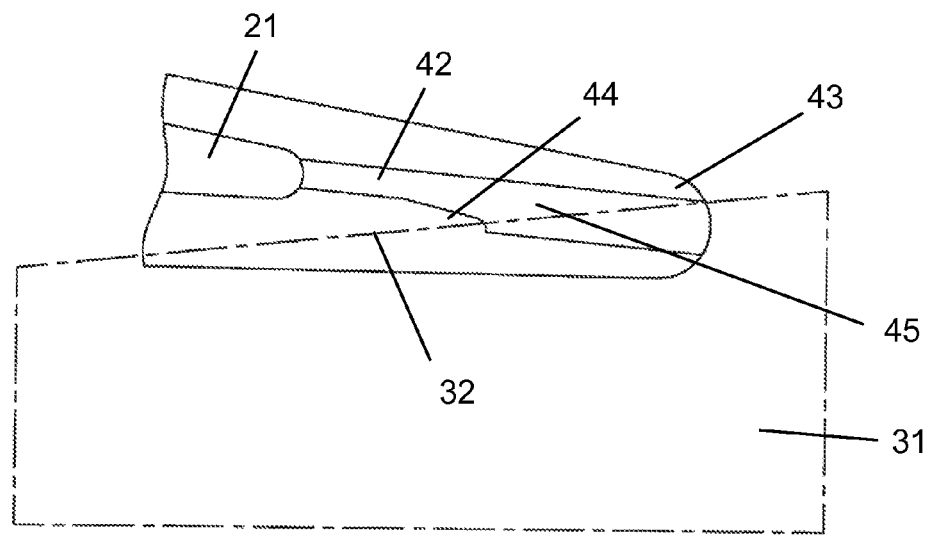
FIG. 7 shows a cross section view of the trailing edge cooling design of the present invention according to a second embodiment.
Figure 8:
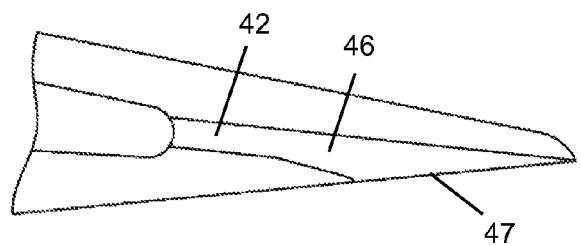
FIG. 8 shows a cross section view of the trailing edge region cooling design of the blade in FIG. 7 after being cut.

FIG. 7 shows another embodiment of the present invention in which a metering and diffusion slot is cast into the airfoil first and then machined to a final shape. The airfoil trailing edge region includes the cooling air supply channel 21, a constant cross section metering section 42, a suction side wall 43 and pressure side wall 44, and a trailing edge exit hole 45. The P/S wall is cast oversized and machined away to leave the finished shape as seen in FIG. 8. The dashed line 31 represents the cutting tool with the cutting surface 32 representing the finished shape on the pressure side. As seen in FIGS. 7 and 8, the pressure side wall is machined to produce a pressure side bleed slot 47 shown in FIG. 8 by removing the excess material on the pressure side wall that formed the exit hole. The metering section 42 opens into a diffusion section 48 that opens into the slot 47.

I claim the following:

1. A process for producing an air cooled turbine airfoil with a trailing edge cooling region comprising the steps of:
   casting an airfoil having a trailing edge region with a suction side trailing edge diameter and a pressure side trailing edge diameter in which the pressure side trailing edge diameter is oversized;
   after casting, machining away the oversized pressure side trailing edge diameter such that a pressure side bleed slot is formed; and,
   machining away the oversized pressure side trailing edge diameter such that a small t/s ratio is produced that cannot be cast into the airfoil.

2. The process for producing an air cooled turbine airfoil of claim 1, and further comprising the step of:
   machining away the oversized pressure side trailing edge diameter so that the pressure side bleed slot surface is tangent to the airfoil trailing edge diameter.

3. The process for producing an air cooled turbine airfoil of claim 1, and further comprising the steps of:
   casting the airfoil with the trailing edge region having an exit hole opening onto the trailing edge of the airfoil; and,
   machining away a surface of the pressure side wall in the trailing edge region to form a pressure side bleed slot from the exit hole.

4. An air cooled turbine airfoil comprising:
   a pressure side wall and a suction side wall;
   a trailing edge region with a metering hole opening discharging into a pressure side bleed slot;
   the pressure side bleed slot being formed by a pressure side trailing edge lip that has a smaller t/s ratio than can be formed by casting; and,
   the trailing edge region and the pressure side bleed slot being formed as a single piece.

5. The air cooled turbine airfoil of claim 4, and further comprising:
   the pressure side bleed slot surface is tangent to an airfoil trailing edge diameter.

6. A process for producing an air cooled turbine airfoil with a trailing edge cooling region comprising the steps of:
   casting an airfoil with a trailing edge region with a cooling air supply channel and a metering and a diffusion section opening into a pressure side bleed slot formed between a trailing edge diameter and a pressure side lip in which the pressure side lip bulges outward from a continuous straight contour formed along the pressure side wall to the trailing edge diameter; and,
   after casting, machining away a section of the pressure side lip and the pressure side wall to leave a continuous straight contour from the pressure side wall to the trailing edge diameter.

7. A process for producing an air cooled turbine airfoil with a trailing edge cooling region comprising the steps of:
   casting an airfoil with a trailing edge region having a correct sized suction side wall and an oversized pressure side wall with a trailing edge exit hole; and,
   machining away a section of the oversized pressure side wall along a straight line to a point where the trailing edge exit hole and the suction side wall merge to form a pressure side exit slot from the trailing edge exit hole.

* * * * *